(12) United States Patent
Levy et al.

(10) Patent No.: US 12,472,452 B2
(45) Date of Patent: Nov. 18, 2025

(54) AIR FILTER UNIT COMPRISING AN ODORANT DISPERSING SYSTEM

(71) Applicant: ALONIM FILTER MARKETING LTD, Ashdod (IL)

(72) Inventors: Itsik Levy, Yavne (IL); Yanni Gingihashvili, Ashdod (IL); Veselin Stefanov Vichev, Ruse (BG); Avraham Pollak, Kfar Saba (IL); Yitzhak Liechtenstein, Zikhron Ya'akov (IL); Nir Hertzman, Zikhron Ya'akov (IL)

(73) Assignee: ALONIM FILTER MARKETING LTD, Ashdod (IL)

( * ) Notice: Subject to any disclaimer, the term of this patent is extended or adjusted under 35 U.S.C. 154(b) by 505 days.

(21) Appl. No.: 17/861,339

(22) Filed: Jul. 11, 2022

(65) Prior Publication Data

US 2023/0018274 A1    Jan. 19, 2023

(30) Foreign Application Priority Data

Jul. 19, 2021    (IL) .......................................... 28492

(51) Int. Cl.
| | |
|---|---|
| *B01D 46/04* | (2006.01) |
| *A61L 9/01* | (2006.01) |
| *B01D 46/00* | (2022.01) |
| *B01D 46/52* | (2006.01) |
| *F24F 8/108* | (2021.01) |
| *F24F 8/50* | (2021.01) |

(52) U.S. Cl.
CPC ............ *B01D 46/0038* (2013.01); *A61L 9/01* (2013.01); *B01D 46/521* (2013.01); *F24F 8/108* (2021.01); *F24F 8/50* (2021.01); *A61L 2209/14* (2013.01); *B01D 2279/50* (2013.01)

(58) Field of Classification Search
CPC . A61L 9/01; B01D 46/00; B01D 46/52; F24F 8/108; F24F 8/50
See application file for complete search history.

(56) References Cited

U.S. PATENT DOCUMENTS

| | | | |
|---|---|---|---|
| 9,352,065 B2 * | 5/2016 | Habbel ................ | B65D 83/265 |
| 9,474,995 B2 | 10/2016 | Hwang et al. | |
| 10,328,169 B2 * | 6/2019 | Marschall ............ | B60H 3/0608 |
| 2006/0121844 A1 | 6/2006 | Sparks | |
| 2012/0079945 A1 | 4/2012 | Roberts | |
| 2015/0290350 A1 | 10/2015 | Marchall | |

FOREIGN PATENT DOCUMENTS

| | | |
|---|---|---|
| CN | 111481095 A | 8/2020 |
| DE | 102014014054 A1 | 3/2016 |

* cited by examiner

*Primary Examiner* — Sharon Pregler
(74) *Attorney, Agent, or Firm* — CANTOR COLBURN LLP

(57) ABSTRACT

The present disclosure concerns odorants or fragrances dispersing systems, more specifically a system designed for dispersing one or more odorant compositions from one or more odorant canisters that are incorporated within an air filter of an air conditioner system. The system is configured to permit dispensing of one or more odorants in a selective manner as per user-demand.

20 Claims, 7 Drawing Sheets

AIR FILTER UNIT COMPRISING AN ODORANT DISPERSING SYSTEM

TECHNOLOGICAL FIELD

The present disclosure concerns odorants (fragrances) dispersing systems, more specifically a system designed for dispersing one or more odorant compositions incorporated within an air filter of an air conditioner system.

BACKGROUND

Air conditioning systems typically include filtering media, e.g. paper of fabric filters, through which air is forced to flow for removal of undesired contaminants. Accumulation of contaminants, external odors, odors from circulating air can all contribute to foul odor of air emitted from the air conditioning system.

Various solutions exist for improving odor of conditioned air. The majority of solutions are designed as passive systems, namely with a reservoir of odorant, through which air is streamed, and passively releases the odorant into the air stream. Other solutions involve spraying arrangements, that release odorant into the stream of air before or after emitting the air from the air conditioning system in defined time intervals. The majority of solutions are typically designed to dispense a single, predetermined odor in a predefined timing, and do not enable on-demand odoration or user selectivity.

GENERAL DESCRIPTION

The present disclosure provides an odorant dispensing device and air filter units comprising such devices that are designed for incorporation into air conditioning system and permit selective, on-demand, dispensing of one or more different odorants, forming together an odor profile according to user preference. The devices of this disclosure permit a user to control and determine a desired odor profile, which can vary from one dispensing cycle to another, such that a desired odor can be dispensed according to different scenarios and purposes (for example stress relief, stimulation, awakening, etc.) based on user preference at the time of dispensing. The devices of this disclosure are also designed to enable dispensing of various combinations of odorants, each having a different scent, such that the combination of scents produces a desired odor profile on demand.

Thus, in one of its aspects, the present disclosure provides an air filter unit, comprising a filter block defined between a forced air inlet face and an air outlet face; an odorant dispensing device that comprises one or more odorant canisters and a selection module configured for selectively actuating dispensing of odorant from said one or more canisters into the forced air flowing through said block; the device being fitted within a device-receiving cavity defined in the filter block between the outlet face and a bottom wall.

In other words, the air filter unit comprises an odorant dispensing system (including the canister and the selection module) which is located within the filter block, such that the odorant(s) can be dispensed by user-demand into the air passing through the filter block. As the dispensing system is positioned within the filter block, a compact arrangement of the unit is obtained, which is also easy to maintain and replace. As the dispensing device can easily be incorporated into standard air filter blocks, air blocks can be retrofitted with dispensing devices of this disclosure with relative ease.

By some embodiments, the odorant dispensing system occupies at most about 25% of the area of the filter air filter unit, e.g. between about 10 and about 20%, thus permitting sufficient filtering area without having a noticeable impact on the filtering efficiency of the filter unit.

As noted, the air filter unit comprises a filter block functioning to filter air entering into/existing from the air conditioner, removing undesired air-borne contaminants from the air. The filter block is typically defined between two external faces: a forced air inlet face which comes into contact with air that is forced through the filter for filtering, and an air outlet face, through which clean air exists the filter. The term filter block as used herein is meant to denote a filtering element, comprising one or more filtering media, designed to remove contaminants from air that is forced through the block. The filter block can be made of any suitable material(s), e.g. paper, fabric (natural or synthetic), felt, plastic, etc. The filter block may have any suitable shape or size.

By some embodiments, the filter block comprises a pleated filter sheet. The unit may comprise a peripheral frame, framing the filter block and enabling ease of installation thereof in the air conditioning system.

In the unit of this disclosure, a cavity is formed within the filter block that is dimensioned to accommodate the odorant dispensing device, such that at least a portion of the device is received with the cavity. In some embodiments, the odorant dispensing device is fully accommodated within the cavity, i.e. the entire device is received within the cavity such that no portion thereof substantially protrudes beyond the air outlet face of the filter block.

The filter block is typically configured for directing forced air to flow partially through the cavity, such that when the odorant dispensing system is operated, odorant dispensed by the system can be carried with the flow of forced air from the filter unit towards the user.

The cavity has shape and dimensions that match those of the odorant dispensing system. By one embodiment, the cavity is elongated along an axis and defined between elongated lateral walls formed within the filter block. The device can, accordingly, have a general elongated configuration defining a device axis that extends between a first device end and second device end, such that the device is dimensioned to fit snugly between the lateral walls of the cavity. However, it is contemplated that the cavity can have any other shape, for example a V-shape, a cross-like shape, or any other shape.

It is important to note that the cavity is formed within the filter block however does not form a bore (i.e. a through-opening) in the filter block. In other words, the bottom wall of the cavity is also lined with or made of a filter medium, as to not to hinder the filtering functionality or efficiency of the filter block. By some embodiments, the bottom wall of the cavity is lined or made of a filter medium having a thickness of at least about 0.3 mm. By some embodiments, the bottom wall of the cavity is made of a non-pleated sheet of filtering material.

The odorant dispensing system can be fixed within the cavity, as to form an integral unit with the filter block. In such a case, replacement of the entire unit can be easily made when the odorant has been exhausted or the filter block is clogged. Alternatively, the odorant dispensing device can be removably received within the cavity, such that replenishing the odorant or replacing of canisters can be easily obtained by temporarily removing the device from the cavity.

As noted, the odorant dispensing device comprises one or more canisters, typically two or more canisters. A canister as used herein refers to a container that holds an odorant composition, and associated with or includes means permitting dispensing of a desired dose of the odorant composition therefrom. The canister can be made of any suitable material, e.g. plastic, metal, glass, ceramics, composite material, etc., that is chemically inert to the odorant composition. The canister can hold the odorant composition under ambient pressure, e.g. in liquid form. Alternatively, the canister can hold the composition therein in gas form, typically pressurized gas. By another example, the composition can be held within the canister in powdered form, and the canister can be designed to gas-propel the powder from the canister. The canister is typically designed to be air and/or moisture tight, and can be transparent, translucent, opaque or light-blocking.

Each of the odorant compositions typically includes at least one fragrance or perfume component. By some embodiments, at least one of the odorant compositions includes one or more essential oils. It is noted that most of the essential oils used for fragrance purposes can be mild-to-aggressive corrosives, and hence tend to corrode metal parts (such as tubing). Unlike typical odorization system which are located relatively remote from the air filter units and require transportation of the odorant composition through tubing, by positioning the odorant dispensing device directedly within the filter block and dispensing the odorant composition into the filtered air permits minimizing, if not eliminating, contact of the odorant composition with metal parts of the air conditioning system, thereby minimizing or even preventing formation of corrosion.

By other embodiments, at least one of the odorant compositions includes an antimicrobial agent, thus reducing or preventing bacterial growth over the filter. By some other embodiments, at least one of the odorant compositions includes at least one essential oil that has an antimicrobial activity.

The device, as noted, comprises one or more canisters. By some embodiments, the device comprises two or more canisters, for example two, three, four, five, six, or even more canisters, and is configured to selectively dispense odorants from the canister(s) upon user demand. Hence, the device can selectively dispense the odorant from a canister upon user-demand for such dispensing, or selectively dispense odorant from more than one canister upon user demand. By some embodiments, the device comprises two or more canisters, each of the canisters holds a different odorant composition. The canisters can have identical or different shapes and volumes.

In some embodiments, the selection module is positioned between two canister blocks, each canister block comprising one or more of the canisters. In some embodiments, the two canister blocks flank the selection module.

Each of the canister blocks can comprise the same number of canisters, e.g. one canister, two canisters, three canisters, etc. in each of the blocks. Alternatively, the number of canisters in one canister block can be different from the other (e.g. one canister block containing one canister, while the other block containing two or more canisters). Typically, at least one of the canister blocks comprises at least two canisters.

Within the odorant dispensing device, each of the canisters is associated with a selection module that is configured to selectively actuate dispensing of odorant from the canisters. The term selectively actuate, or any lingual various thereof, means to denote that the selection module is configured to permit actuation of dispensing of a desired odorant from a desired canister in the device, depending on user-demand for a specific scent to be dispersed. As will now be explained, the selection module is associated with each of the canisters in the device and is controlled to actuate dispensing of odorants from the canisters in any desired combination of sequence, depending on user demand at any given time. In some embodiments, specific combinations and actuation patterns are a priori programmed into the selection module. By other embodiments, a user can selectively choose to dispense odorants from one or more of the canisters at any given combination upon demand.

By some embodiments, the odorant dispensing device comprises one or more pumps, such that each of the canisters is independently associated with a respective pump. Each of the pumps is associated with the selection module; hence, each of the pumps can be independently operated by the selection module to selectively actuate dispensing of odorant from the canisters.

The pump can be any suitable type of pump. By some specific embodiments, the pumps are pressure pumps, each comprising a piston that is fitted in the canister and associated with a compression chamber. The pressure pumps are configured to compress gas (e.g. air, nitrogen, etc.) in the compression chamber, thus causing increase in pressure within the chamber and displacement of the piston to cause dispensing of odorant from the canister.

The piston is typically fitted within the canister in a fluid-tight manner, as to prevent leakage of the odorant out from the canister. For example, the piston can be fitted with a fluid-tight rubber gasket or O-ring that forms a fluid-tight seal with the inner walls of the canister.

The selection module, by some other embodiments, comprises at least two motors, each motor associated with one of the canister blocks, and configured for selectively actuating dispensing of odorant from the canisters of the canister block. Each of the motors can be individually operated by the selection module, hence control of odorant dispensing from each of the canister blocks can be obtained. Each of said motors is typically configured with an actuation element, that is fitted onto a rotatable axel of the motor. Thus, rotation of the motor's axel causes displacement of the actuation element between various operational positions, each of the operational positions corresponds to a point of association between a canister and the actuation element.

By such other embodiments, each canister comprises a canister body that holds an odorant composition, an actuatable dispensing pump for dispensing said odorant from the canister, and an actuation cap associated with said dispensing pump configured to actuate the dispensing pump upon application of pressure thereonto. Hence, the motor is configured to rotate the axel between the one or more operational positions, each operational position brining the actuation element into association with a respective actuation cap of one of the canisters, thereby applying pressure thereonto to dispense the odorant from the canister.

Thus, by controlling the position of the actuation elements, selective actuation of the canisters can be obtained, resulting in selective controlled release of a combination of odorant compositions from the canisters upon user demand.

Each motor can be associated with two or more axially displaceable pistons, that are reciprocally displaceable between an engaging position, in which the piston engages the actuation cap of the canister to apply pressure thereonto, and a non-engaging position in which no pressure is applied onto the actuation cap.

According to some other embodiments, each axially displaceable piston is associated with a respective motor that are reciprocally displaceable between an engaging position, in which the piston engages the actuation cap of the canister to apply pressure thereonto, and a non-engaging position in which no pressure is applied onto the actuation cap.

By some embodiments, the canisters are positioned in the device such that a dispensing outlet thereof dispenses the odorant directly into the air stream. According to other embodiments, the canisters are positioned in the device such that a dispensing outlet thereof dispenses odorant onto a defined portion of the filter block. According to some other embodiments, each of said canisters comprises a porous element at a dispensing end thereof, configured to at least partially adsorb dispensed odorant thereonto and permit release of odor over a prolonged period of time.

The selection module can, by some embodiments, be configured to dispense a sequence of odorants, as desired by the user on demand or as a priori programmed. By other embodiments, the selection module is configured for selective concomitant actuation of one or more of the canisters. As each of the pumps or motors can be independently operated, the selection module can be operated to independently actuate dispensing of odorant compositions from each of the canisters, or concomitantly from two or more canisters.

The canisters can be integrally formed with the selection module. Alternatively, and preferably, the canisters can be detachably associated with the selection module as to permit replacement of the canisters when exhausted. The canisters, by some embodiments, can carry one or more identification and/or authentication means, which are readable/recognizable by the selection module. Alternatively, the canisters can include one or more mechanical or electronical identification means, that are configured to interact with a recognition mechanism associated or being part of the odorant dispensing device (for example, different resistors or a pattern of electrical contacts that can be closed or switched differently by each canister, thereby providing its identification). In such a manner, attachment of unauthorized or non-matching canister can be prevented, and identification of the type of canister (e.g. type of odor) can be obtained.

The selection module is typically electrically operated. The selection module can be fed electricity from an air conditioning unit or system into which the filter unit is fitted. Alternatively, the selection module can include a power source, e.g. a replaceable or rechargeable battery.

The selection module can be manually activatable by the user. However, by some preferred embodiments, the selection module is electronically operated, either wired or wirelessly.

The selection module, by some embodiments, comprises a communication and control utility that is configured to communicate with a user-operable control utility, e.g. an application installed on a hand-held device or integrated into the operation or entertainment system of a vehicle in which the air filtering unit is installed, for receiving a demand for odorization from a user. The communication and control module can be further configured to provide the user with various feedbacks and indications associated with the odorant dispensing device, such as status of operation, indication on malfunctions, indication on odorant dispensing sequence or process, alerts indicating that one or more canisters need to be replaced, authentication alerts (e.g. in case an unauthorized canister is fitted into the device), etc.

The filter units of this disclosure can be fitted into any suitable air conditioning system, e.g. central air conditioning system, mini central air conditioning system, stand-alone air conditioning units, air coolers, ventilation systems, air conditioning system in a vehicle (e.g. car, truck), etc.

By another aspect of this disclosure, there is provided an odorant dispensing device that comprises one or more odorant canisters and a selection module configured for selectively actuating dispensing of odorant from said one or more canisters into the forced air flowing through said block, as described herein, the device being sized for fitting into a device-receiving cavity defined in a filter block of an air filter unit.

By some embodiments, the odorant dispensing device is configured for use in the air filter unit described herein.

By another aspect, there are provided odor canisters for use in an air filtering unit or an odorant dispensing device described herein.

As used herein, the term about is meant to encompass deviation of ±10% from the specifically mentioned value of a parameter, such as temperature, pressure, concentration, etc.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
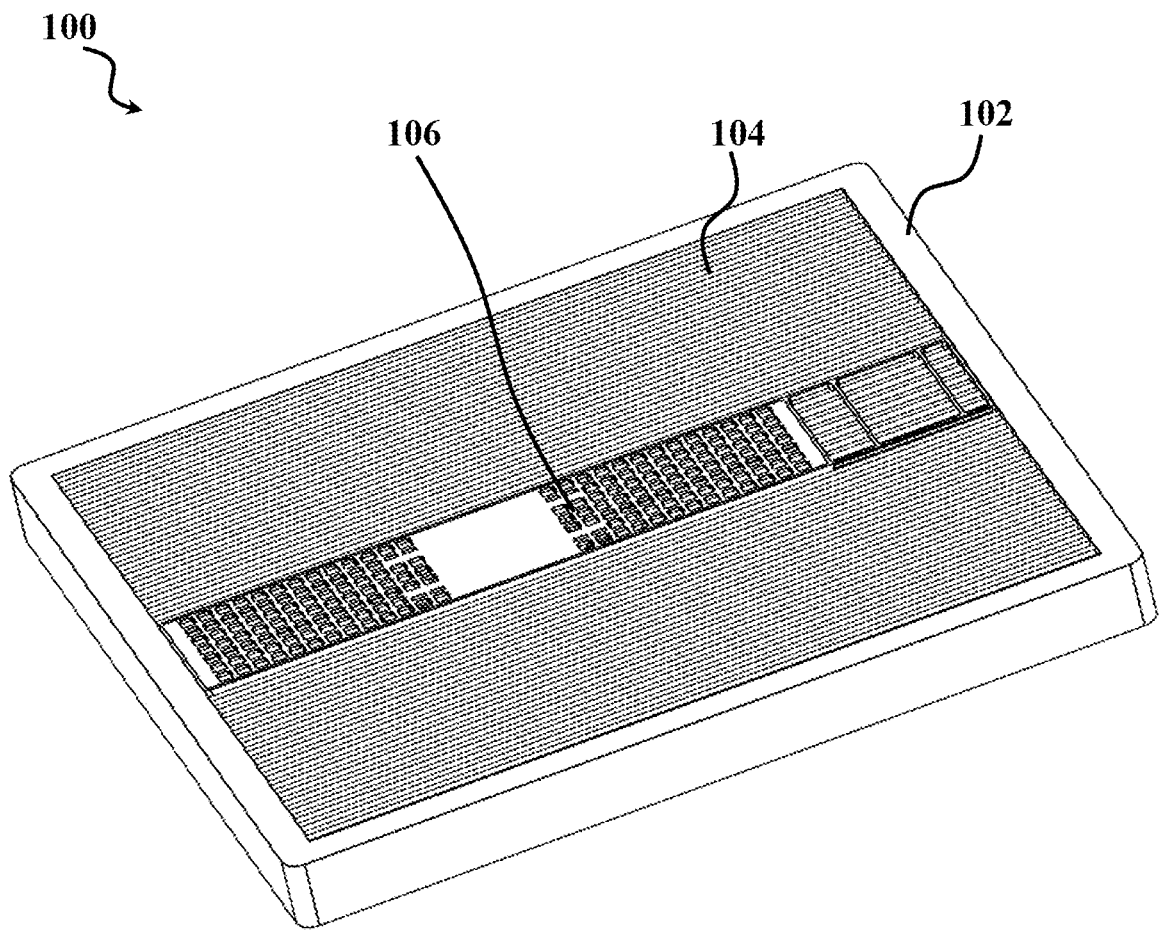
FIG. 1 is a perspective top view of a filter unit according to an embodiment of this disclosure.

Tuning first to FIG. 1, shown is a filter unit according to an embodiment of this disclosure. Filter unit 100 comprises a frame 102, which may be flexible, semi-rigid or rigid, framing and holding a filter block 104. In this specific example, filter block 104 is made out of a pleated sheet of filtering media, e.g. paper or rigidified fabric. However, it is to be understood that the filter block can be made of any other suitable filtering material and can have any other configuration, e.g. a porous block of material, a rigid or pliable foam, compacted paper, etc.

Figure 5:
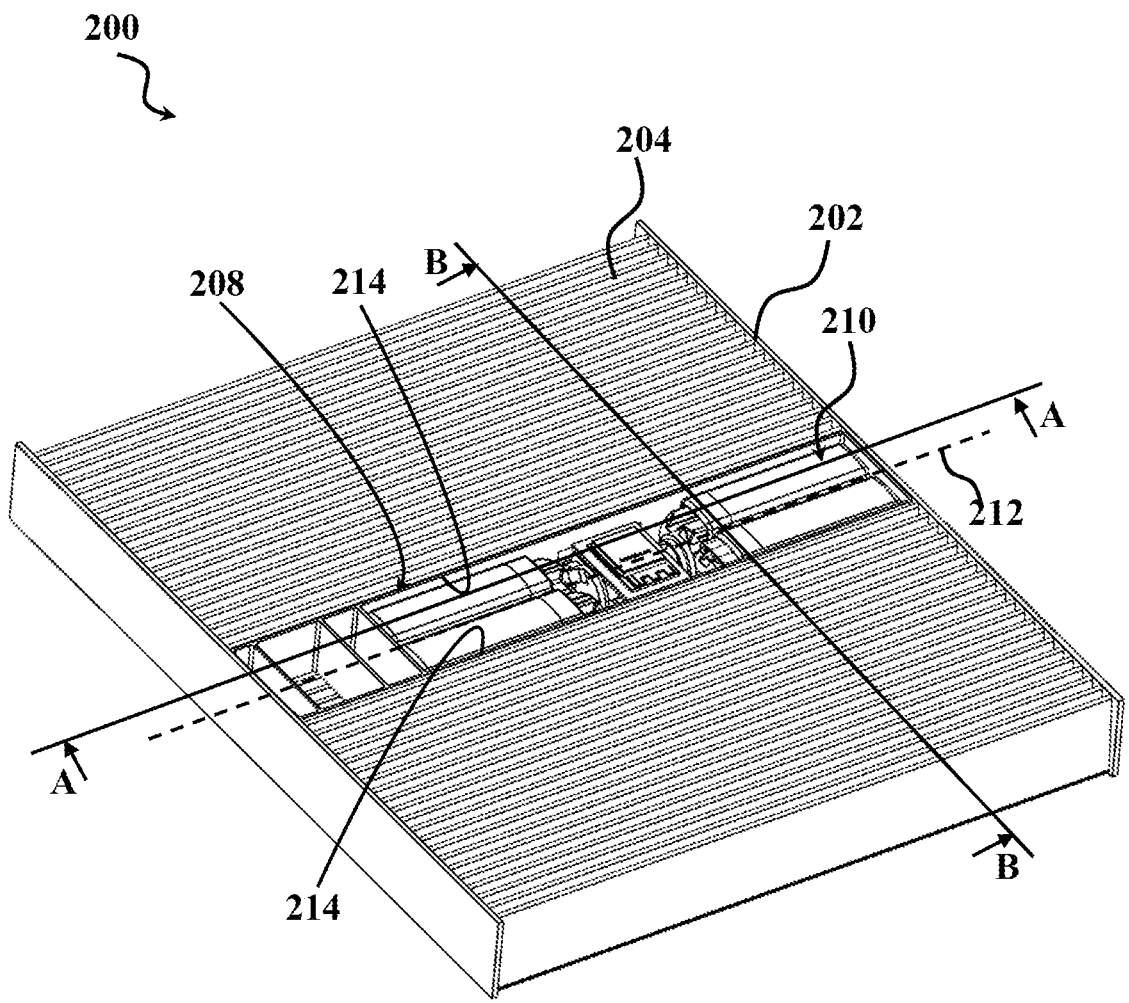
FIG. 5 is a perspective top view of a filter unit according to another embodiment of this disclosure, with the top cover removed.

Within filter block 102, there is defined a cavity 108 (better seen in FIG. 2 or FIG. 5), that is typically covered by a perforated decorative cover 106, that functions both to hide the odor dispensing device and to direct fragranced air towards the user or into the space to be fragranced.

Figure 2:
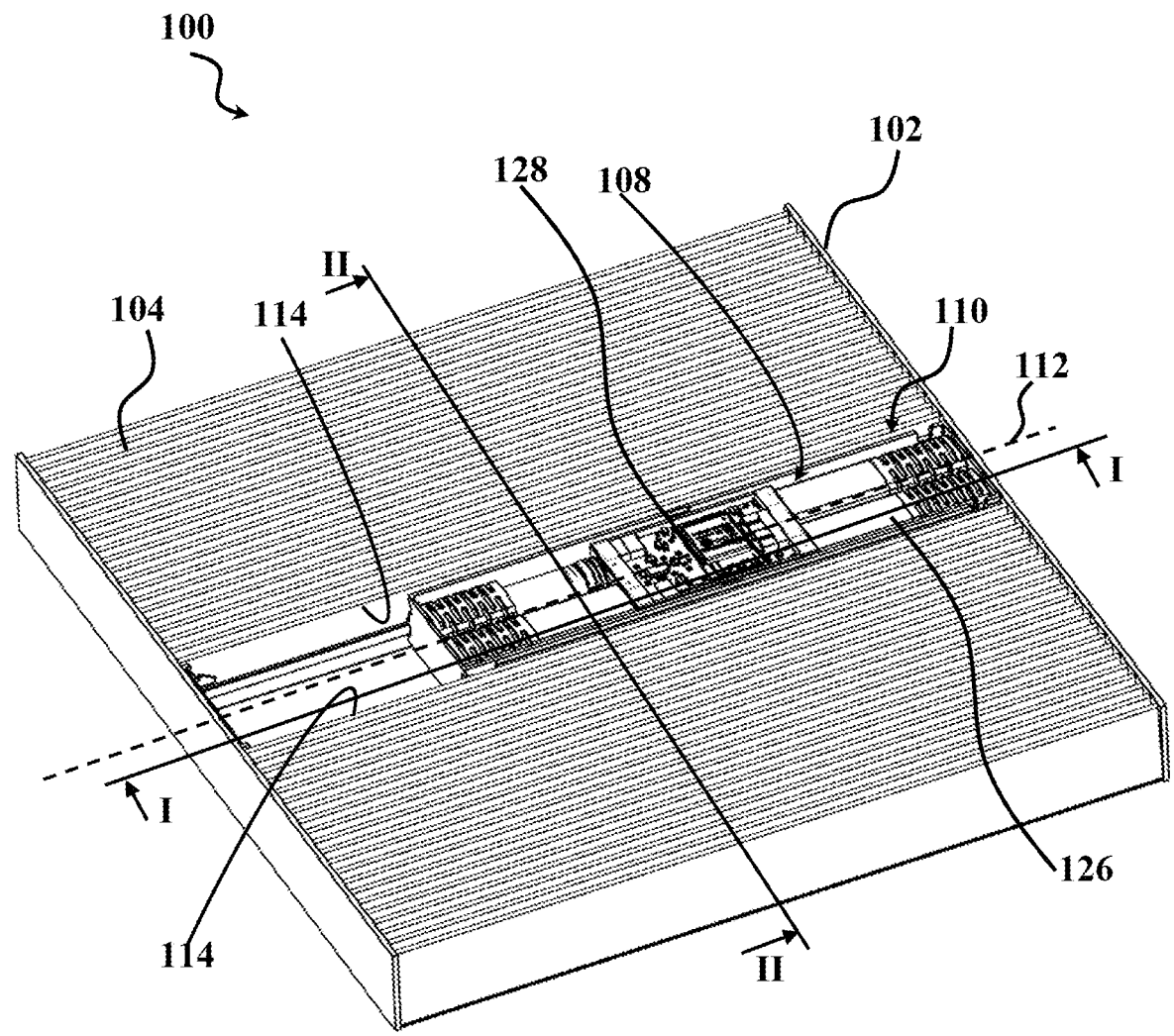
FIG. 2 is a perspective top view of a filter unit according to an embodiment of this disclosure, with the top cover removed.

As can be seen in FIG. 2, the cover 106 has been removed to expose the odorant dispensing device, generally designated 110, and is fully accommodated within the cavity, as to not to protrude beyond the filter block.

Figure 3A:
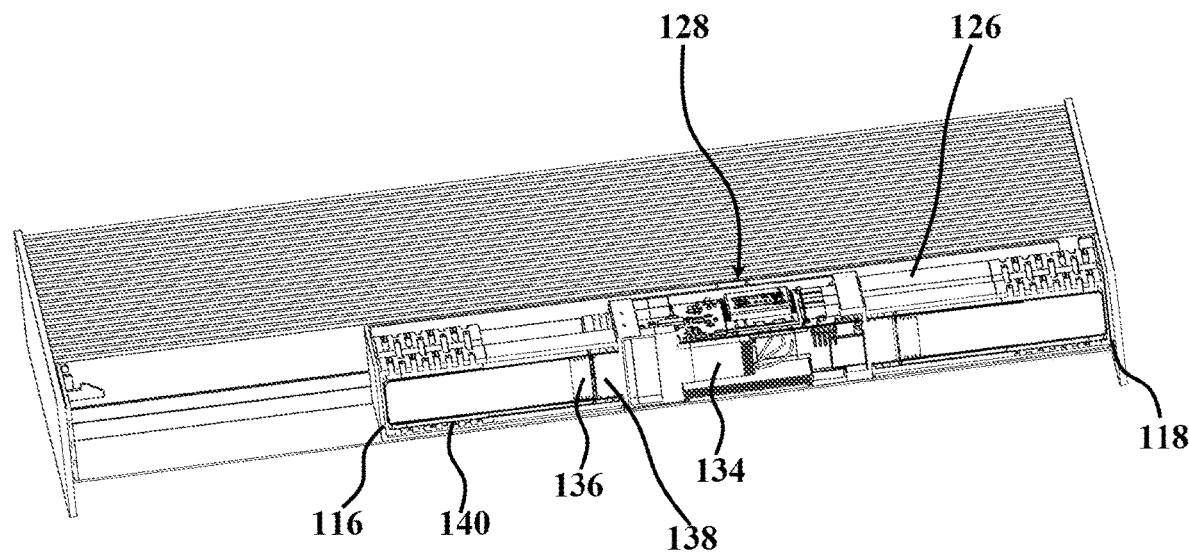
FIGS. 3A-3B are perspective cross-sectional views of the filter unit of FIG. 2, along lines I-I and II-II, respectively.
Figure 3B:
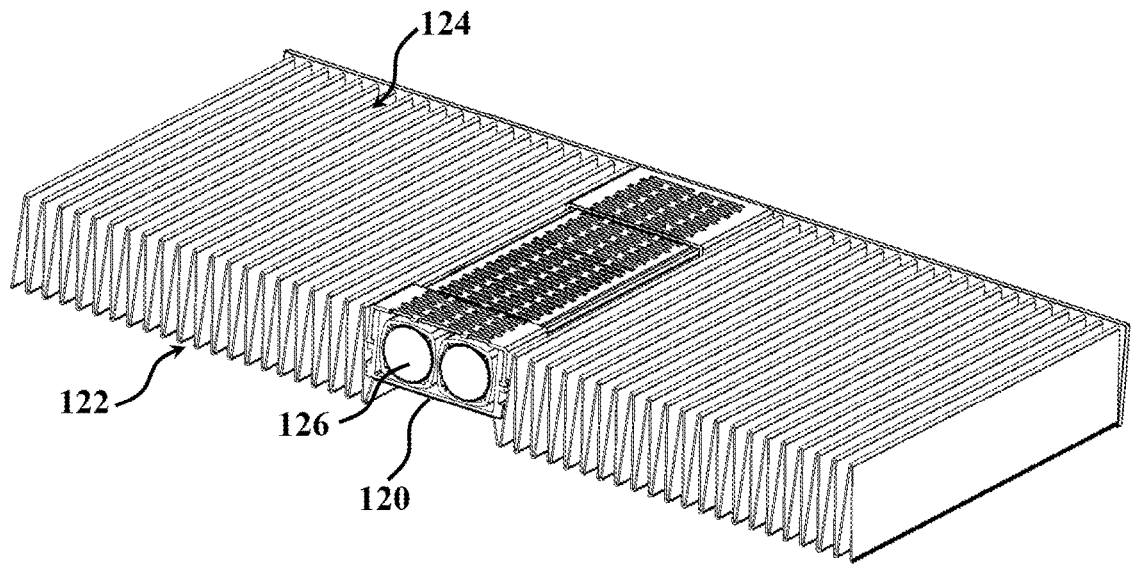
Figure 4:
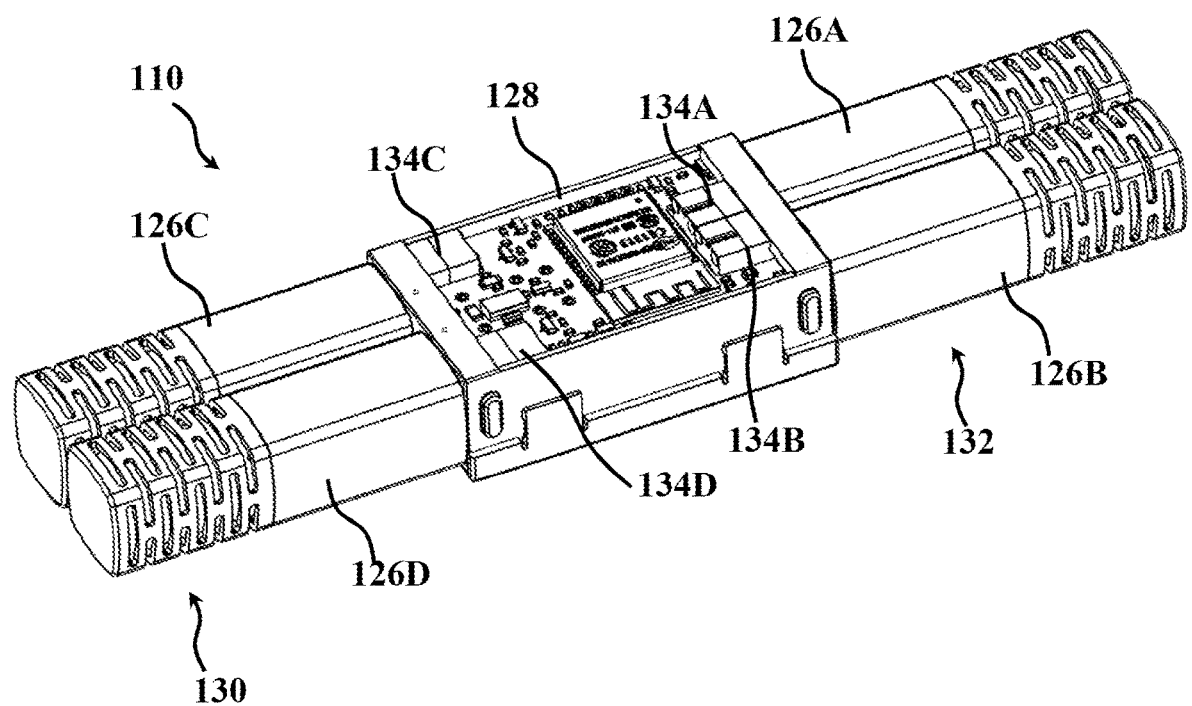
FIG. 4 is a perspective view of an odorant dispensing device according to the embodiment of FIG. 2.

Seen in FIGS. 2-4 is one exemplary odorant dispensing device fitted within the air filter unit and in isolation. As can be seen, cavity 108 has shape and dimensions that match those of the odorant dispensing device 110. Cavity 108 is elongated along an axis 112 and defined between elongated lateral walls 114 formed within the filter block. The device 110 has also an elongated configuration, and extends between a first device end 116 and second device end 118. However, it is contemplated that other cavity and device shapes can be used with the same principles of operation disclosed herein. As can be seen in FIG. 3B, in this exemplified embodiment, the cavity's bottom wall 120 is formed out of the filter medium that is non-pleated, forming a cavity sized and shaped to hold the odorant dispensing device 110 such that it is substantially flush with the top surface of the filter block.

The filter block 102 functions to filter air entering into/existing from the air conditioner, removing from the air undesired air-borne contaminants. Therefore, the filter block typically has two external faces: a forced air inlet face 122 which comes into contact with air that is forced through the filter for filtering, and an air outlet face 124 through which clean air exists the filter. Thus, air enters through face 122, passes through the filter media, and exists the filter through face 124.

Odorant dispensing device 110, seen in isolation in FIG. 4, comprises one or more canisters collectively designated 126, in this specific example four such canisters 126A, 126B, 126C and 126D, and a selection module 128 that operates to selectively actuate one or more of the canisters to dispense an odorant. The selection module 128 of is typically positioned between two canister blocks, generally designated 130 and 132. In this specific example both blocks 130 and 132 include the same number of canisters, however it is also contemplated within the scope of this disclosure that the canister blocks can be composed of different numbers of canisters.

In the embodiment of FIGS. 2-4, the odorant dispensing device comprises pumps 134A-134D, with each of the canisters 126A-126D being independently associated with its respective pump. Each of the pumps 134 is associated with the selection module 128, and hence each of the pumps can be independently operated by the selection module to selectively actuate dispensing of odorant from the canisters.

The pumps can be any suitable type of pump. In the specific exemplified embodiment, pumps 134 are pressure pumps, each comprising a piston 136 that is fitted in the canister 126 and is associated with a compression chamber 138. Each pump 134 is configured to compress gas (e.g. air, nitrogen, etc.) in its associated compression chamber 138, thus causing increase in pressure within the chamber 138 and displacement of the piston 136 to cause dispensing of odorant from the canister 126.

In this embodiment, each canister comprises a porous element 140, e.g. a sponge or a fabric, at the canister's dispensing end. The porous element 140 is designed to at least partially adsorb dispensed odorant and permit release of odor over a prolonged period of time.

While in this specific example a porous element is exemplified, it is also possible for the odorant to be dispensed directly into the air flow or directly onto the filter medium.

Another exemplified embodiment is shown in FIGS. 5-7B. In this embodiment, elements being the same as those in the embodiment of FIGS. 2-4, however shifted by 100. Namely, element 104 in FIGS. 2-4 is the same as element 204 in FIGS. 5-7B.

Device 200 is shown in FIGS. 5-7B, the selection module 228 includes two independently operated motors 252 and 254, associated respectively with canister blocks 230 and 232 through actuation elements 252A and 254A. Actuation elements 252A and 254A are fitted onto respective rotatable axels of motor 252 and 254 (one of these axels, axel 256, is seen in FIG. 6A). Thus, independent rotation of the motor axels in the direction of axes 252B and 254B, respectively, causes displacement of the actuation element between various operational positions, each of the operational positions corresponds to a point of association between a canister and the actuation element.

Figure 6A:
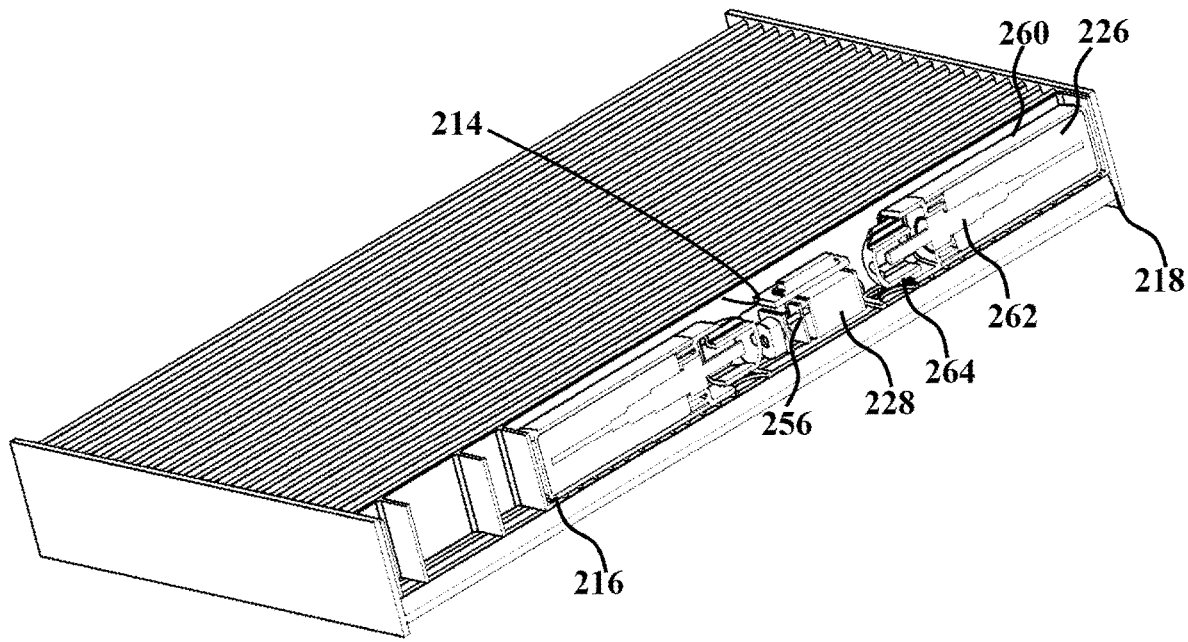
FIG. 6A-6B are perspective cross-sectional views of the filter unit of FIG. 5 along lines A-A and B-B, respectively.
Figure 6B:
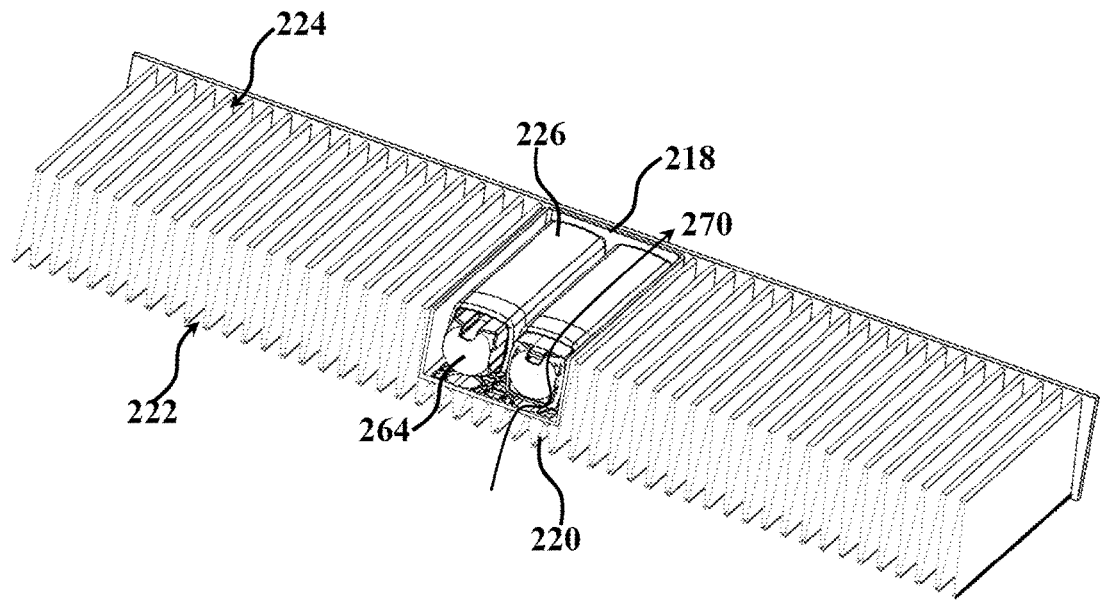
Figure 7A:
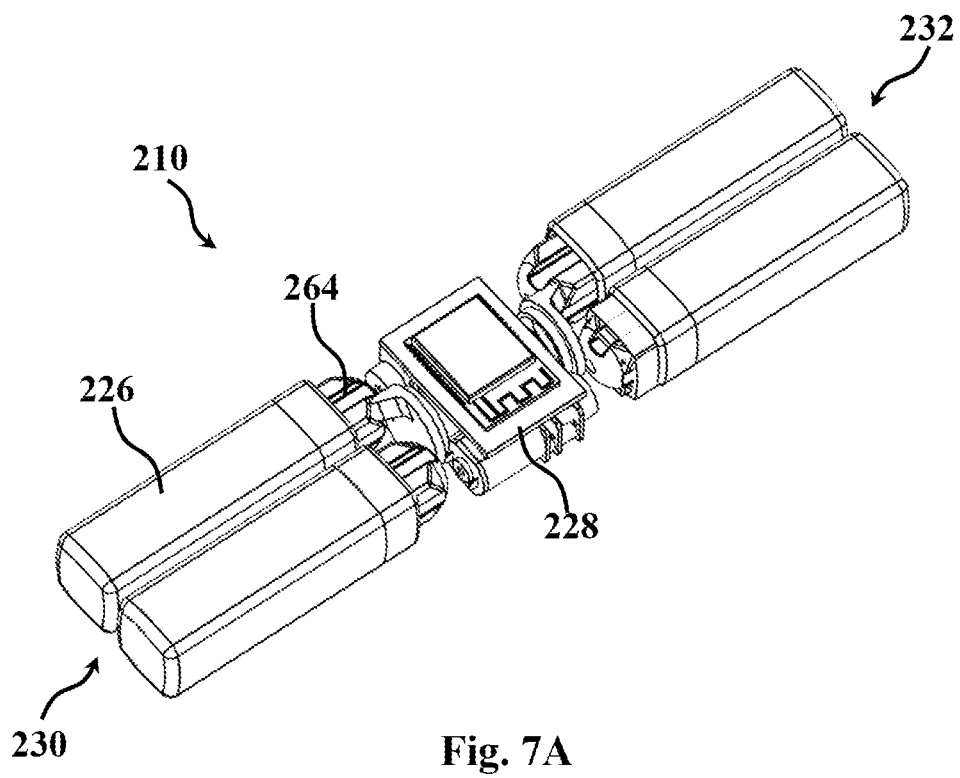
FIGS. 7A-7B are perspective and close-up views, respectively, of an odorant dispensing device according to the embodiment of FIG. 5.
Figure 7B:
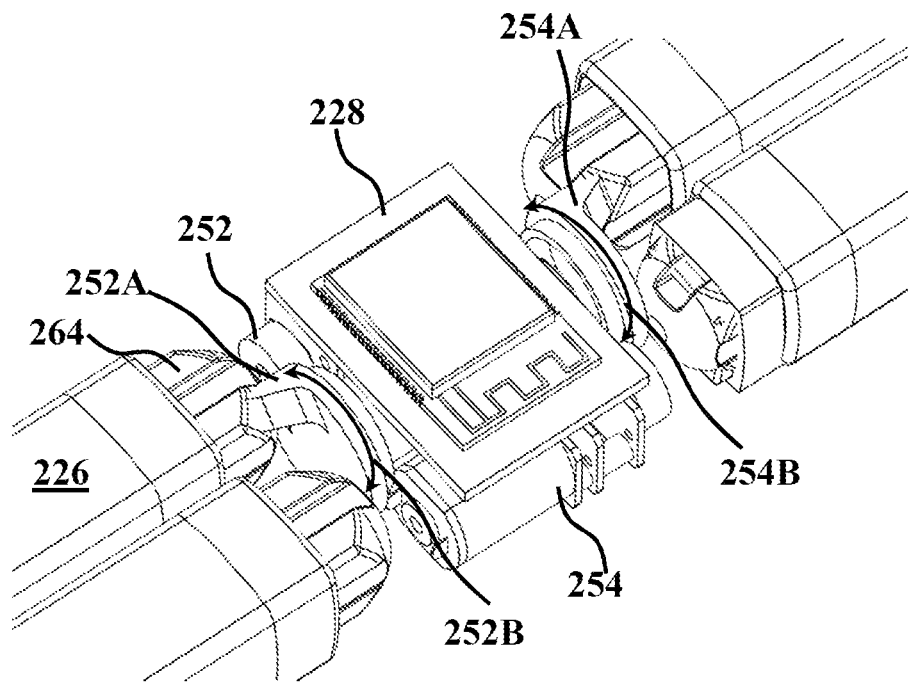

As seen in FIG. 6A, each canister 226 comprises a canister body 260 that holds an odorant composition, an actuatable dispensing pump 262 for dispensing odorant from the canister, and an actuation cap 264 associated with dispensing pump 262 and is configured to actuate the dispensing pump upon application of pressure thereonto. Actuation elements 252A and 254A are configured to be rotated their respective axels such that in each of their operational positions, the actuation element is brought into association (i.e. contact) with a respective actuation cap 264 of one of the canisters 226, thereby applying pressure onto the actuation cap 264 to dispense the odorant from the canister 226. Thus, rotation of the actuation elements by the motors can selectively dispense odorants from different canisters 226 at any desired sequence or combination upon user demand.

At least a portion of the forced air passing through the filter unit passes though filter block along the direction of arrow 270 (FIG. 6B), passing through cavity 208. During its passing, the odor dispensing unit is operated, and a combination of odorant is dispensed from the canisters into onto filter section 220 and thereby odorizing the air passing therethrough as per user demand.

As noted, the selection module (128,228) is typically electrically operated and associated with a powder source (not shown), either being a part of an air conditioning unit or system into which the filter unit (100,200) is fitted, or a replaceable or rechargeable battery. Further, the selection module can be manually operated or electronically operated, either wired or wirelessly. The selection module can further include a communication and control utility (not shown) that is configured to communicate with a user-operable control utility, e.g. an application installed on a hand-held device, for receiving a demand for odorization from a user. The communication and control module can be further configured to provide the user with various feedbacks and indications associated with the odorant dispensing system, such as status of operation, indication on malfunctions, indication on odorant dispensing sequence or process, alerts indicating that one or more canisters need to be replaced, authentication alerts (e.g. in case an unauthorized canister is fitted into the system), etc.

The invention claimed is:

1. An air filter unit, comprising:
   a filter block defined between a forced air inlet face and an air outlet face, the filter block being formed out of one or more filter media;

an odorant dispensing device that comprises one or more odorant canisters and a selection module configured for selectively actuating dispensing of odorant from said one or more canisters into the forced air flowing through said block, the selection module being associated with each of said one or more odorant canisters and is controlled to actuate dispensing of odorants from the one or more canisters depending on user demand;

the device being fitted within a device-receiving cavity defined in the filter media between the outlet face and a bottom wall.

2. The filter unit of claim 1, wherein the filter block is configured for directing forced air to flow partially through the cavity.

3. The filter unit of claim 1, wherein the cavity is elongated along an axis with elongated lateral walls, and the device has an elongated configuration defining a device axis extending between a first device end and second device end, the device being dimensioned to fit between the lateral walls.

4. The filter unit of claim 1, comprising two or more of said canisters.

5. The filter unit of claim 1, wherein the selection module is positioned between two canister blocks, each canister block comprising one or more of said canisters.

6. The filter unit of claim 1, wherein the odorant dispensing device comprising one or more pumps, each of the canisters is independently associated with a respective pump of said one or more pumps, each of the pumps being associated with said selection module.

7. The filter unit of claim 6, wherein said selection module is configured to independently actuate each of said pumps to dispense odorant from said canisters.

8. The filter unit of claim 6, wherein said pumps are pressure pumps, each comprising a piston fitted in the canister, and associated with a compression chamber, the pumps being configured to compress gas in said compression chamber for displacing the piston, thereby causing dispensing of odorant from the canister.

9. The filter unit of claim 1, wherein the selection module comprises at least two motors, each motor associated with one of the canister blocks, and configured for selectively actuating dispensing of odorant from the canisters of the canister block, wherein each of said motors is configured with an actuation element fitted onto a rotatable axel of the motor.

10. The filter unit of claim 9, wherein each of said two or more canisters comprises a canister body that holds an odorant composition, an actuatable dispensing pump for dispensing said odorant from the canister, and an actuation cap associated with said dispensing pump configured to actuate the dispensing pump upon application of pressure thereonto, and wherein said motor is configured to rotate said axel between one or more operational positions, each operational position brining the actuation element into association with a respective actuation cap of one of the canisters, thereby applying pressure thereonto to dispense said odorant.

11. The filter unit of claim 1, wherein each of said canisters comprises a porous element at a dispensing end thereof, configured to at least partially adsorb said odorant thereonto after dispensing and permit release of odor over a prolonged period of time.

12. The filter unit of claim 1, wherein the odorant dispensing device comprises two or more canisters and wherein the selection module is configured for selective concomitant actuation of two or more of the canisters.

13. The filter unit of claim 1, wherein the odorant dispensing device comprises two or more canisters and wherein each of said canisters holds a different odorant composition.

14. The filter unit of claim 1, wherein said one or more canisters are detachably associated with said selection module as to permit replacement of said canisters.

15. The filter unit of claim 1, wherein said selection module is manually activatable.

16. The filter unit of claim 1, wherein said selection module is electronically operated.

17. The filer unit of claim 1, wherein said selection module comprises a communication and control utility, configured to communicate with a hand-held device, configured for receiving a demand for odorization from a user.

18. The filter unit of claim 1, wherein each of said one or more canisters comprises identification means, and said selection module is configured to identify said identification means.

19. The filter unit of claim 1, wherein the device is fully accommodated within the cavity.

20. An odorant dispensing device, the device comprising one or more odorant canisters and a selection module configured for selectively actuating dispensing of odorant from said one or more canisters into the forced air flowing through a filter block, the selection module being associated with each of said one or more odorant canisters and is controlled to actuate dispensing of odorants from the one or more canisters depending on user demand, and the device being configured for fitting into a device-receiving cavity defined in a said filter block of an air filter unit according to claim 1, the filter block being formed out of one or more filter media.

* * * * *